(No Model.)
H. M. DEVOE.
WHEEL TIRE.
No. 519,177.  Patented May 1, 1894.
Fig: 1.
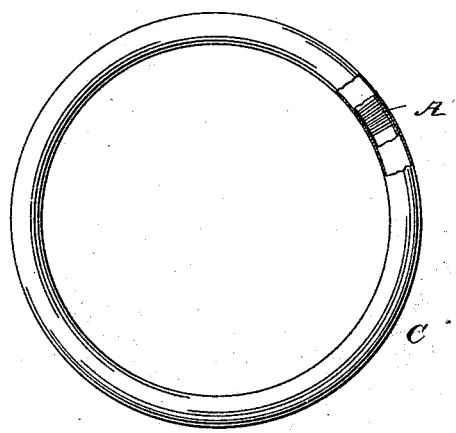
Fig: 3.
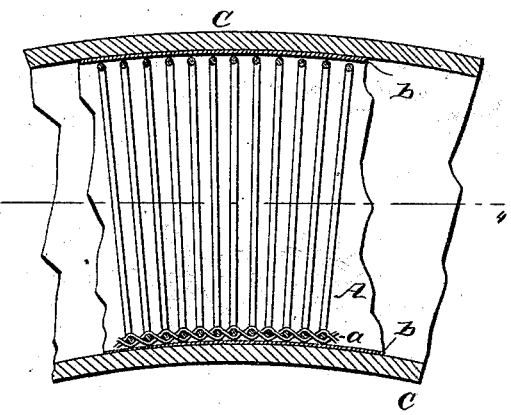
Fig: 2.
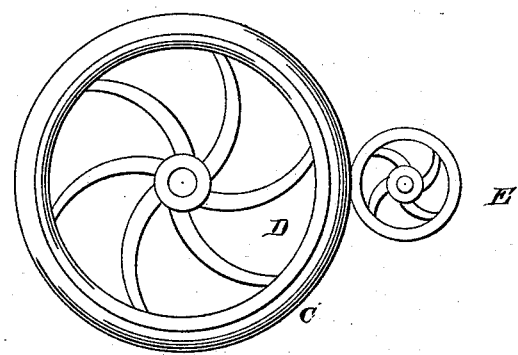
Fig: 4.
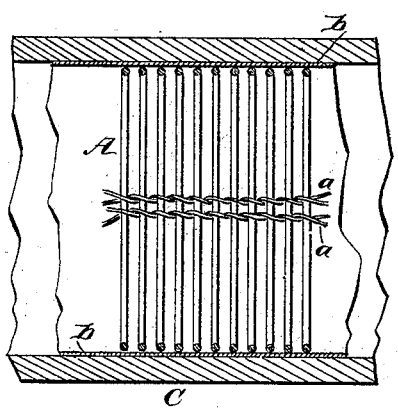
Fig: 5.   Fig: 6.
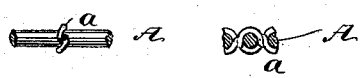
WITNESSES:
Chas. Nioll.
C. Seelzwick
INVENTOR
H. M. Devoe
BY Munn & Co
ATTORNEYS.
THE NATIONAL LITHOGRAPHING COMPANY,
WASHINGTON, D. C.

UNITED STATES PATENT OFFICE.

HARRY M. DEVOE, OF NEW YORK, N. Y.

WHEEL-TIRE.

SPECIFICATION forming part of Letters Patent No. 519,177, dated May 1, 1894.

Application filed March 7, 1893. Serial No. 464,987. (No model.)

*To all whom it may concern:*

Be it known that I, HARRY M. DEVOE, of New York city, in the county and State of New York, have invented a new and Improved Wheel-Tire, of which the following is a specification, reference being had to the annexed drawings, forming a part thereof, in which—

Figure 1 is a side elevation of my improved wheel tire, with parts broken away to show the interior construction. Fig. 2 is a side elevation, showing the application of the wheel tire to frictional driving gearing. Fig. 3 is an enlarged transverse section of the tire, taken through the center thereof, parallel with the plane of rotation. Fig. 4 is a horizontal section taken on line 4—4 in Fig. 3. Fig. 5 is a side elevation of a portion of one of the convolutions of the wire; and Fig. 6 is a transverse section of the spiral, showing the tie wire.

Similar letters of reference indicate corresponding parts in all the views.

The object of my invention is to construct a tire for pulleys and wheels for frictional driving gear and for vehicle wheels, in which collapsing will be avoided and the necessity of inflating with air will be obviated; also to provide a tire which will not be destroyed or materially injured by puncturing.

My invention consists in an elastic tubular tire provided interiorly with a continuous coil spring whose convolutions are connected on the inner side of the tire by means of wires interwoven with the coils, as hereinafter described.

In carrying out my invention, I form a wire spiral A, of circular or elliptical cross section, and connect the ends of the wire, thereby forming an endless spiral, and I lace together the convolutions of the wire spiral by means of one or more pairs of wires $a$, woven into the spiral as shown, that is to say, the binding or tie wire is carried over and under alternate convolutions of the spiral, the binding wire being twisted, thereby forming a twisted wire cable which embraces in its coils the separate convolutions of the spiral spring A.

Although I prefer to connect the convolutions of the spiral by means of the twisted wire woven in as described, on the inner circumference of the tire, I do not limit or confine myself to this arrangement, as the binding wire may be applied at different places on the spiral; for example—it may be applied at the inner circumference, as shown in the drawings, also at the sides, or the inner half of the spiral may be completely enveloped by wires woven into the spiral as described.

Upon the endless spiral A, I place one or more layers $b$ of strong cloth, which is either wrapped around the spiral and sewed, or applied in the form of strips and sewed or cemented, or both, and upon this covering is placed the outer coating C, which is composed of elastic material such as soft rubber. The rubber forming the elastic covering C, is vulcanized by any of the well known processes, the tire formed of the wire spiral, the cloth and the rubber, being placed in the vulcanizer and submitted to the vulcanizing process.

The particular connection of the spring coil with the tie wires, and the fact that in the outer portion of the tire the coils are not interwoven with tie wires, allow the said coils play in the direction of the diameter of the wheel so as to not interfere with the resilience of the tire, while the tie wires form, as it were, the members of a truss to transfer the strain upon a coil to the adjacent coils, whereby the coils are effectively prevented from lying down or being pressed into one another when the weight or pressure is put upon the wheel.

My improved wheel tire is designed to be used for pulleys for receiving belts, for frictional driving gear for machinery, and for the wheels of vehicles, such as bicycles, tricycles, sulkies and carriages.

In Fig. 2 I have shown a method of applying my improved tire to the wheels of frictional driving gear. In this case, the wheel D is furnished with a tire constructed in accordance with my improvement, while the wheel E is preferably made of turned and finished metal, the two wheels being arranged to roll in frictional contact.

My improved tire yields sufficiently in contact with the rigid wheel to allow it to engage enough of the surface of the metal wheel to insure an effective frictional contact. When the tire is used on bicycles or tricycles, it is applied and used in the same manner as the well known pneumatic tire, with the exception of the omission of the devices employed for inflation and for retaining the air in the tire. By varying the size of the wire of the spiral, any desired degree of rigidity may be secured.

A tire constructed according to my invention is practically non-collapsible, and its elasticity will not be affected when the covering of the tire is punctured. The tire requires no inflation, and it is entirely independent of the felly, to which it may be secured by cement. The tire also has the advantage of being made to withstand any amount of pressure, by increasing or diminishing the size and form of the wire and the thickness of the cloth and elastic covering.

Having thus described my invention, I claim as new and desire to secure by Letters Patent—

1. An elastic tubular tire having an endless coiled spring arranged in its interior, and tie wires interwoven with the coils of the spring, the coils being left free in the outer portion of the tire, substantially as described, whereby the coils are allowed play in the direction of the diameter of the tire, yet prevented from being pressed into one another, the tie wires being adapted to act to restore the individual coils to their normal position, and transfer the strain upon any particular coil to the adjacent coils, as set forth.

2. An elastic tire having an endless wire spring coiled in the interior, the diameter of the coils being essentially equal to the inner diameter of the tire, and tie wires extending longitudinally of the tire and interwoven with the coils of the spring on a portion of the circumference thereof, substantially as described, whereby the coils are allowed play in the direction of the diameter of the tire, yet prevented from being pressed into one another, as set forth.

3. As an improved article of manufacture, an elastic tire formed of an elastic tube, a cloth covering applied on the inner surface thereof, an endless, coiled wire spring located in the tube with its coils in essential continuous contact with the said cloth covering, and one or more pairs of elastic tie wires which are interwoven with the coils of the spring passing alternately over and under adjacent convolutions or coils of the spring and being twisted together intermediately thereof, substantially as and for the purpose set forth.

HARRY M. DEVOE.

Witnesses:
E. M. CLARK,
F. W. HANAFORD.